Aug. 26, 1930.  E. O. ELLIOTT  1,774,361
LOCOMOTIVE TRUCK
Filed Feb. 17, 1930   3 Sheets-Sheet 1
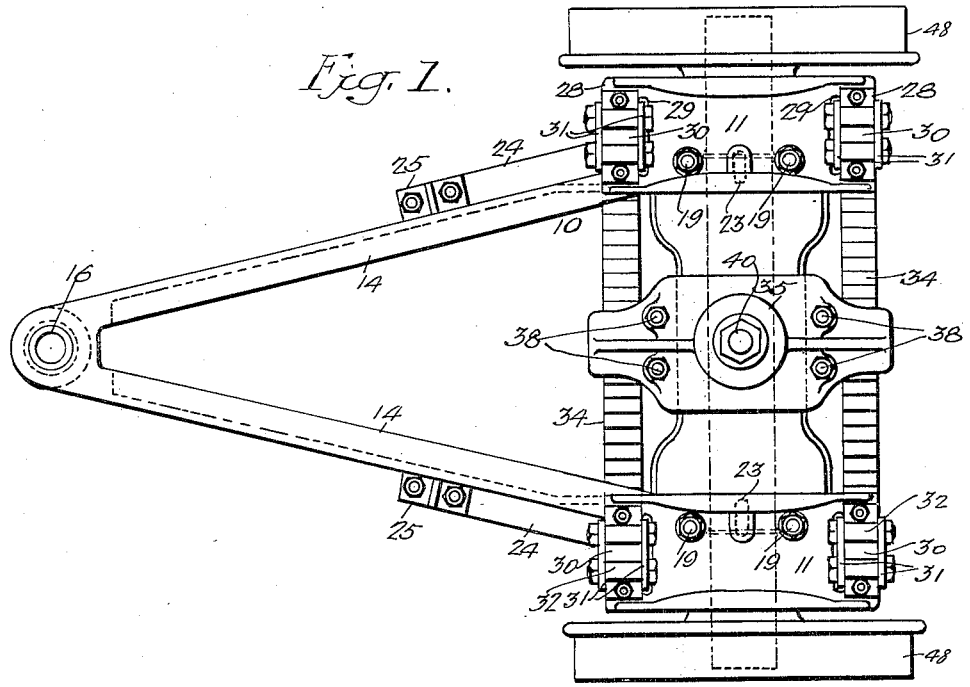
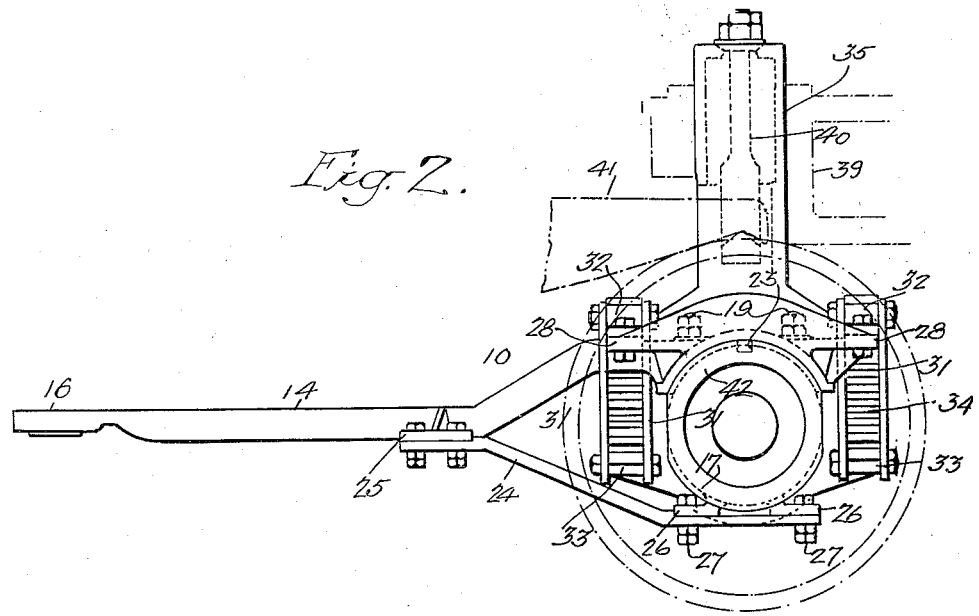
Inventor:-
Edward O. Elliott
by his Attorneys

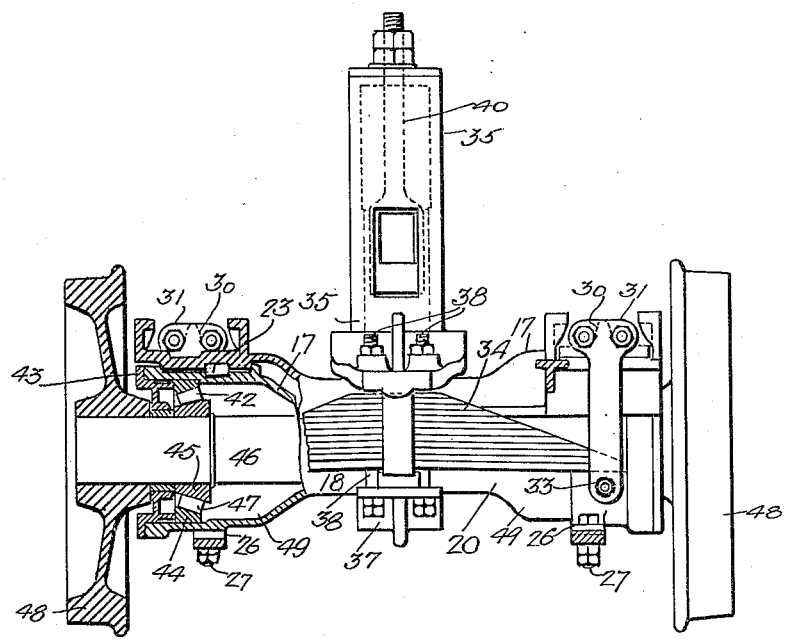

Aug. 26, 1930.    E. O. ELLIOTT    1,774,361
LOCOMOTIVE TRUCK
Filed Feb. 17, 1930    3 Sheets-Sheet 3

Inventor:-
Edward O. Elliott
by his Attorneys

Patented Aug. 26, 1930

1,774,361

UNITED STATES PATENT OFFICE

EDWARD O. ELLIOTT, OF JENKINTOWN, PENNSYLVANIA

LOCOMOTIVE TRUCK

Application filed February 17, 1930. Serial No. 429,110.

This invention relates to locomotive trucks of the two-wheel type, in which the bearings for the axle of the truck are on the inside of the wheels. The truck is provided with a radius bar which is pivotally connected to the locomotive frame at a distance from the axle.

One object of this invention is to make the frame of a truck of the above-mentioned type as an integral casting.

Another object of the invention is to provide a truck of this type with roller-bearings, the housing of the roller-bearings being made separate from the frame and secured thereto.

A further object of the invention is to connect the lower portion of the roller-bearing housing with a radius bar by a brace, which not only aids in retaining the housing in position but also acts as a brace for the radius bar.

A still further object of the invention is to make the casings for the two roller-bearings integral with the connecting member, which forms a housing not only for the bearings but also for the axle.

In the accompanying drawings:

Fig. 1 is a plan view of a locomotive truck of the two-wheel type, illustrating my invention;

Fig. 2 is a side view with one wheel removed;

Fig. 3 is an end view partly in section;

Figs. 9 and 10 are views illustrating modifications.

Figure 4:
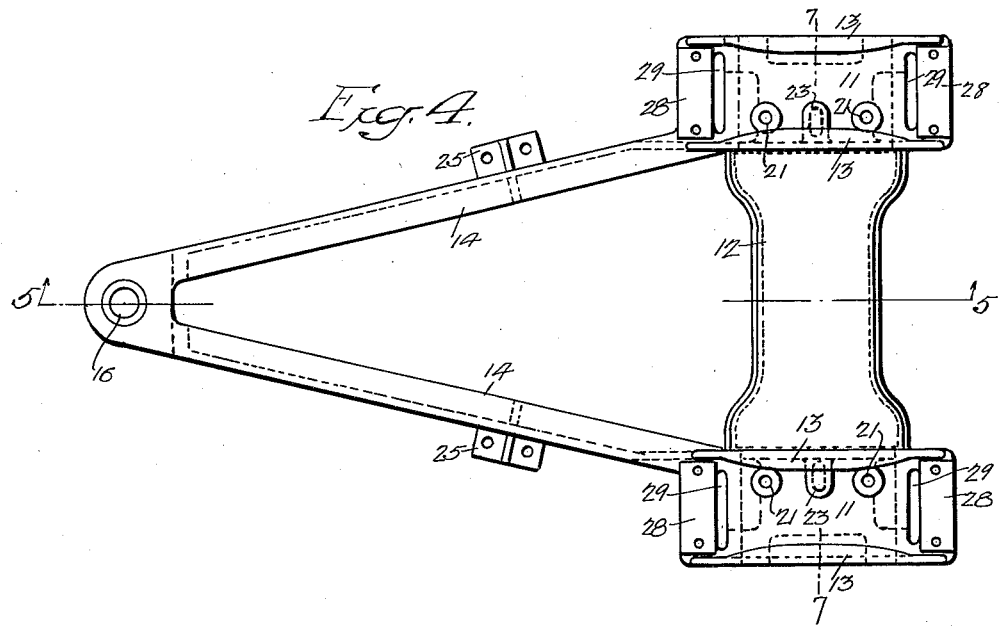
Fig. 4 is a plan view of the integral frame.
Figure 5:
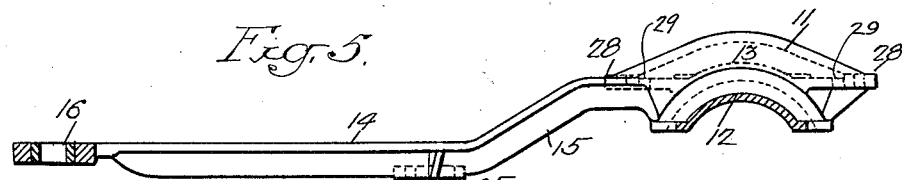
Fig. 5 is a longitudinal sectional view on the line 5—5, Fig. 4.
Figure 7:
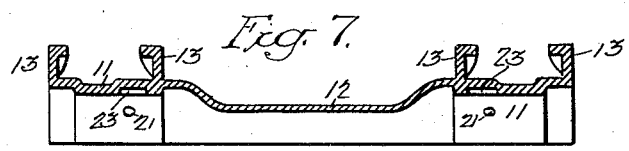
Fig. 7 is a transverse sectional view on the line 7—7, Fig. 4.
Figure 6:
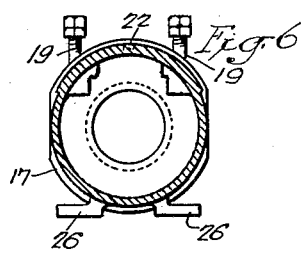
Fig. 6 is a detached sectional view of the roller-bearing housing.
Figure 8:
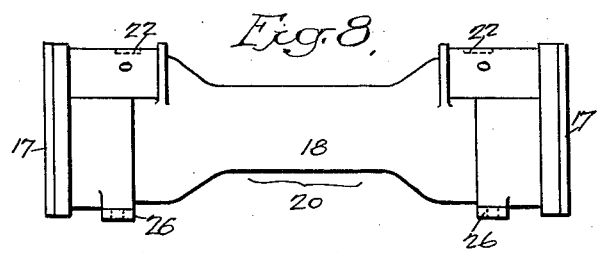
Fig. 8 is a side view of the bearing housing.

The frame 10 of the truck is made in a single casting, consisting of two arched members 11, which extend over the bearings, and a connecting member 12 curved transversely and enlarged at each end where it joins the arched members 11. The arched members have two ribs 13, which are tapered at each end as shown in Fig. 5. These ribs reinforce the arched members. Projecting from the inner side of each arched member is a member 14 of a radius bar. Each member is inclined as at 15, as shown in Fig. 5, to form an upper brace, and these members are arranged at an angle in respect to the center line of the truck and terminate in a bearing 16 for the pivot pin of the truck, which projects from a fixed portion of the locomotive frame.

The two bearing-enclosing casings 17—17 are connected by an integral tubular member 18, the whole forming an integral housing 20. Projecting from the bearing casings of the housing are stud-bolts 19, which extend through openings 21 in the arched members 11 of the frame, and when the nuts on these bolts are drawn tightly, the housing 20 is fitted into the curved portion of each of the members 11—11, and in addition to the stud-bolts a key may be inserted through keyways 22 in the housing 23 in the curved member 11 of the frame. In order to hold the housing perfectly rigid and take the strain off the stud-bolts, the lower ends of each housing at the bearings are connected by a brace 24 to the radius bars 14, each of which has pads 25 to which the ends of the braces are secured by bolts. The braces form the lower braces of the radius bar. Each brace extends under the housing and is secured by bolts 27 to projecting lugs 26 on the housing, directly under the casings for the bearings. This makes a very rigid construction and one which can be readily assembled.

Projecting from each side of the arched portions 11 of the frame 10 is a bracket 28 having slots 29, and mounted on these brackets are link-bearings 30 secured thereto by bolts as shown. These bearings have a center rib, and on each side of the rib is a pin 32, and suspended from the two pins are links 31 which carry at their lower ends a pin 33. It will be understood that there are a pair of links on each side of the center line of the truck and the inner link of each pair extends through a slot 29 in each bracket 28. The ends of transverse carrying springs 34 rest upon these pins 33 and support the combined center pin and swing-bolster 35, which is extended over the springs and is attached thereto by clamps 37 and bolts 38. The center pin 35 extends through a bearing mounted in a cross-tie 39 forming part of the locomotive structure. Suspended from the upper end of the center pin 35 is a link 40, the lower end of which is engaged by an equalizing lever 41. The proportion of the weight which the truck is to carry is transmitted through this equalizing lever. Mounted within each casing 17 of the housing 20 are roller-bearings 42. The roller-bearings are held in place by rings 43 secured to the outer ends of the casings 17, as shown in Fig. 3. The ring holds the outer raceway 44 in position within the casing and the inner raceway 45 is mounted on the axle 46, and between the inner and outer raceways are rollers 47 of any suitable type.

It will be noticed that the axle extends through the housing 20 and has wheels 48 secured to each end thereof beyond the bearings. The housing in this instance entirely encloses the axle and the bearings and can be made a receptacle for lubricant, which will keep the roller-bearings lubricated at all times. In the present instance the housing is depressed as at 49 to form pockets for the lubricant.

Suitable gauging openings and inspection openings may be made in the portion 18 of the housing which may be closed by plugs of any type desired.

By the above construction it will be seen that the improved two-wheel swing-truck for a locomotive can be made comparatively light and of great strength; that the housing containing the axle and the bearings for the axle can be readily detached from the frame when desired; and that when the parts are assembled the housing is rigidly secured to the frame. While roller-bearings are preferred, it will be understood that other bearings may be used without departing from the essential features of the invention.

In Fig. 9 the housing 20ª is made in three parts, the two bearing enclosing casings 17ª being secured to the connecting tubular member 18ª by bolts or other fastening means, and in some instances the connecting part 18ª may be dispensed with.

In Fig. 10 the bearing casing 17ᵇ is made flat on its upper side to fit against a flat surface of the frame casting 10ª.

I claim:

1. The combination in a two-wheel swing-truck of a locomotive, of an integral frame consisting of two end members and a connecting member extending from one end member to the other and a radius bar, the parts of which extend from each end member to a common center, forming the bearing for the pivot pin; a housing consisting of a central tubular member and a casing at each end of said member for the axle and its bearings; and means for securing the said housing in the frame of the truck.

2. The combination in a truck for a locomotive, of an integral frame consisting of two arched members and a connecting member extending from one arched member to the other; a housing for the axle and its bearings, said housing having casings at each end for the bearings; and means for securing said housing to the frame of the truck 3. The combination in a locomotive truck, of an integral frame having two arched members and a connecting member between the arched members and a radius bar extending from the arched members; a tubular housing for an axle, having a casing at each end for bearings for the axle; and a brace at each side of the truck extending from the radius bar to a casing of the housing.

4. The combination in a locomotive truck, of an integral frame having two arched members and a connecting member between the arched members and a radius bar extending from the arched members; a tubular housing for an axle, having a casing at each end for bearings for the axle; and a brace at each side of the truck extending under the casing of the housing, said housing having two lugs to which the said brace is attached.

5. The combination in a two-wheel truck for a locomotive, of an integral frame having arched members at each side and a connecting member extending from one arched member to the other; a radius bar; a tubular housing through which the axle of the truck extends; cylindrical casings at each end of the housing, each casing being rounded at its upper end to fit the arched members of the frame; and means for securing the tubular housing to the frame.

6. The combination in a two-wheel truck for a locomotive, of an integral frame having arched members at each side and a connecting member extending from one arched member to the other; a radius bar extending from the arched members; a tubular housing through which the axle of the truck extends; cylindrical casings at each end of the housing, each casing being rounded at its upper end to fit the arched members of the frame; vertical stud-bolts projecting from the casings of the housings and through openings in the arched members of the frame; and nuts on the stud-bolts for drawing the housing firmly against the arched members of the frame.

7. The combination in a two-wheel truck for a locomotive, of an integral frame having arched members at each side and a connecting member extending from one arched member to the other; a radius bar extending from the arched members; a tubular housing through which the axle of the truck extends; cylindrical casings at each end of the housing, each casing being rounded at its upper end to fit the arched members of the frame; means for securing the tubular housing to the frame; lugs on each side of the center of each casing of the housing; and a brace secured to both lugs and extending to a point some distance from the housing and secured to a radius bar.

8. The combination in a two-wheel truck for a locomotive having inside bearings, of an integral frame consisting of two arched members and a member connecting the arched members; a two-part radius bar, the parts terminating in a center pivot bearing; a housing having casings at each end secured to the arched members in the casings; an axle extending through the housing; and roller-bearings mounted in each casing.

9. The combination in a two-wheel locomotive truck having inside bearings, of a frame consisting of two arched members spaced apart and a connecting member between the arched members; a radius bar having parts extending from each arched member and terminating in a center pivot bearing, the connecting member being curved in cross-section; a housing located under the connecting member and the arched members and having casings at each end for bearings; means for securing the housing to the arched members; an axle extending through the housing; bearings for the axle located in the casings of the housing; wheels on the ends of the axles beyond the bearings; a semi-elliptical spring on each side of the housing; means for suspending the outer ends of the springs from the frame; and a center pin structure extending across the frame and attached to the center of each spring.

10. The combination in a two-wheel swing-truck for a locomotive, of an integral frame consisting of two arched end members and a connecting member extending from one arched end member to the other and a radius bar, the parts extending from each arched end member to a common center, forming the bearing for a pivot pin; and a casing secured to each end of said frame, said casing being arranged to receive the axle bearings.

EDWARD O. ELLIOTT.